United States Patent
Masuo

(10) Patent No.: US 9,739,291 B2
(45) Date of Patent: Aug. 22, 2017

(54) COOLING FAN

(71) Applicant: MINEBEA MITSUMI Inc., Kitasaku-gun, Nagano (JP)

(72) Inventor: Satoshi Masuo, Kitasaku-gun (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 16 days.

(21) Appl. No.: 14/685,551

(22) Filed: Apr. 13, 2015

(65) Prior Publication Data

US 2016/0298653 A1     Oct. 13, 2016

(51) Int. Cl.
| | | |
|---|---|---|
| F04D 19/00 | (2006.01) | |
| F04D 25/08 | (2006.01) | |
| G06F 1/18 | (2006.01) | |
| G06F 1/20 | (2006.01) | |
| F04D 29/66 | (2006.01) | |
| F04D 29/52 | (2006.01) | |
| F04D 29/60 | (2006.01) | |
| F04D 29/64 | (2006.01) | |

(52) U.S. Cl.
CPC ......... *F04D 29/668* (2013.01); *F04D 19/002* (2013.01); *F04D 19/007* (2013.01); *F04D 25/08* (2013.01); *F04D 29/522* (2013.01); *F04D 29/601* (2013.01); *F04D 29/646* (2013.01); *G06F 1/183* (2013.01); *G06F 1/20* (2013.01)

(58) Field of Classification Search
CPC .... F04D 29/668; F04D 29/325; F04D 29/522; F04D 29/646; F04D 25/08; F04D 19/002; F04D 19/007; G06F 1/183; G06F 1/20; H05K 7/20136; H01L 23/467; F21V 29/40; F21V 29/67; G02F 1/133385
USPC .............. 361/679.46–679.54, 688–723; 454/184–186, 188–193, 228–368
See application file for complete search history.

(56) References Cited

U.S. PATENT DOCUMENTS

| | | | |
|---|---|---|---|
| 6,549,410 B1 * | 4/2003 | Cohen ................. | H01L 23/4006 165/185 |
| 2003/0161103 A1 * | 8/2003 | Wrycraft ............... | H01L 23/467 361/695 |
| 2004/0228722 A1 * | 11/2004 | Horng .................. | F04D 29/582 415/66 |
| 2005/0106026 A1 * | 5/2005 | Oosawa ................ | F04D 19/007 416/198 R |
| 2006/0083608 A1 * | 4/2006 | Sun ....................... | F04D 19/007 415/199.4 |
| 2007/0059155 A1 * | 3/2007 | Ishihara ................ | F04D 19/007 415/60 |

(Continued)

FOREIGN PATENT DOCUMENTS

| | | |
|---|---|---|
| JP | 2000-064997 A | 3/2000 |
| JP | 2000-120598 A | 4/2000 |

(Continued)

*Primary Examiner* — Anthony Haughton
*Assistant Examiner* — Yahya Ahmad
(74) *Attorney, Agent, or Firm* — Masuvalley & Partners

(57) ABSTRACT

A dual rotating axial fan includes a first axial fan element having a first motor that rotates a first impeller, a second axial fan element having a second motor that rotates a second impeller, and a clamping element coupling the first axial fan element to the second axial fan element in series so that the first axial fan element or the clamping element can move relative to the second axial fan element.

19 Claims, 11 Drawing Sheets

(56) References Cited

U.S. PATENT DOCUMENTS

| | | | | |
|---|---|---|---|---|
| 2008/0008576 | A1* | 1/2008 | Hong | F04D 19/007 415/68 |
| 2009/0226299 | A1* | 9/2009 | Jin | F04D 19/007 415/66 |
| 2010/0014966 | A1* | 1/2010 | Zhou | F04D 29/64 415/220 |
| 2010/0021317 | A1* | 1/2010 | Hanaoka | F04D 29/542 417/244 |
| 2010/0027219 | A1* | 2/2010 | Lu | F04D 25/0613 361/697 |
| 2010/0142136 | A1* | 6/2010 | Bougaev | G06F 1/20 361/679.02 |
| 2010/0189544 | A1* | 7/2010 | Nakamura | F04D 19/007 415/68 |
| 2010/0230077 | A1* | 9/2010 | Cao | H01L 23/467 165/121 |
| 2010/0232933 | A1* | 9/2010 | Chen | F04D 29/668 415/119 |
| 2011/0032675 | A1* | 2/2011 | Lian | H01L 23/4006 361/697 |
| 2011/0067836 | A1* | 3/2011 | Tang | F04D 25/166 165/67 |
| 2011/0110040 | A1* | 5/2011 | Liu | H01L 23/4006 361/696 |
| 2012/0053496 | A1* | 3/2012 | Wu | A61H 7/003 601/97 |
| 2013/0195622 | A1* | 8/2013 | Liu | F04D 19/007 415/119 |
| 2013/0216372 | A1* | 8/2013 | Wang | F04D 19/007 415/213.1 |
| 2014/0205437 | A1* | 7/2014 | Zhu | F04D 19/007 415/119 |
| 2015/0023786 | A1* | 1/2015 | Li | F04D 29/646 415/199.4 |
| 2015/0125262 | A1* | 5/2015 | Liu | F04D 29/646 415/68 |
| 2015/0233387 | A1* | 8/2015 | Liu | F04D 19/02 29/889.3 |
| 2016/0146221 | A1* | 5/2016 | Gu | F04D 29/644 415/213.1 |

FOREIGN PATENT DOCUMENTS

| | | |
|---|---|---|
| JP | 2000-124650 A | 4/2000 |
| JP | 2000-130389 A | 5/2000 |
| JP | 2001-085585 A | 3/2001 |
| JP | 4144037 B2 | 9/2008 |
| JP | 3150936 U | 6/2009 |
| JP | 5386353 B2 | 1/2014 |

* cited by examiner

COOLING FAN

TECHNICAL FIELD

The present invention relates to a cooling fan, more specifically, a dual rotating axial fan.

BACKGROUND OF THE INVENTION

In an ideal world, we could perfectly balance all rotating devices without vibration. Unfortunately, this is not yet possible, and fans are similar to all rotating devices in this aspect. Depending on the level of the balance and the speed of a fan, there will be a certain level of vibration generated by fan products.

Isolation between a fan and a structure which the fan is mounted on should be considered in every system of designs to reduce the fan vibration. Also, any possible resonances between the frequency of a rotation of a fan and its mounting structure should be considered. We have seen situations where these resonances created up to an additional acoustic noise at the system level.

SUMMARY OF INVENTION

It is an object of the present invention to reduce vibration caused by an axial fan structure, especially a structure where two axial fans are combined in series.

One aspect of the present invention is a dual rotating axial fan including:

a first axial fan element having a first motor that rotates a first impeller;

a second axial fan element having a second motor that rotates a second impeller; and a clamping element coupling the first axial fan element to the second axial fan element in series so that the first axial fan element or the clamping element can move relative to the second axial fan element.

According to the first aspect of the present invention, because the first fan element or the clamping element can move relative to the second fan element, the dual rotating axial fan can reduce vibration generated by the first motor and the second motor. This effect is particularly notable when the fan rotates at high speed. When the dual rotating axial fan according to the first aspect of the present invention is used, for example, in a server computer, it is possible to effectively reduce vibration which may badly affect the operation of the hard disk drive in the computer. However, the dual rotating axial fan according to the first aspect of the present invention can, of course, be used for many other products, such as a refrigerator, and can achieve the same effect of reducing vibration.

Another aspect of the present invention is a computer including:

a circuit board;

a power supply;

a hard disk drive; and a dual rotating axial fan which cools down the circuit board, the dual rotating axial fan having a first axial fan structure and a second axial fan structure which are connected face-to-face in series by a joint part, wherein the joint part has a rivet and a spring.

According to the second aspect of the present invention, because the joint part by which two fan structures are connected has a rivet and a spring, the dual rotating axial fan can reduce vibration generated by the first axial fan structure and the second axial fan structure. The present invention can effectively reduce vibration which may badly affect the operation of the hard disk drive of the computer. This effect is particularly notable when the fan rotates at high speed.

Another aspect of the present invention is a counter-rotating axial fan including:

a first axial fan element having a first motor that rotates a first impeller, the first motor and the first impeller being located within a first fan housing;

a second axial fan element having a second motor that rotates a second impeller in a direction opposite the first impeller, the second motor and the second impeller being located within a second fan housing; and a clamping element coupling the first fan housing to the second fan housing in series, wherein the clamping element includes a fastener having a spring located about the fastener.

According to the third aspect of the present invention, because the first axial fan element and the second axial fan element are connected by a clamping element, and the clamping element includes the fastener having the spring located about the fastener, the counter-rotating axial fan can reduce vibration generated by the first motor and the second motor. This effect is particularly notable when the fan rotates at high speed. When the counter-rotating axial fan of the third aspect of the present invention is used for a computer, the present invention can effectively reduce vibration which may badly affect the operation of the hard disk drive inside the computer. However, the counter-rotating axial fan of the third aspect of the present invention can, of course, be used for many other products, such as a refrigerator, and can achieve the same effect of reducing vibration.

DESCRIPTION OF EMBODIMENTS

Embodiments of the present invention will be described hereinafter with reference to the accompanying drawings, in which preferred exemplary embodiments of the invention are shown. The ensuing description is not intended to limit the scope, applicability or configuration of the disclosure. Rather, the ensuing description of the preferred exemplary embodiments will provide those skilled in the art with an enabling description for implementing preferred exemplary embodiments of the disclosure. It should be noted that this invention may be embodied in different forms without departing from the spirit and scope of the invention as set forth in the appended claims.

Figure 1:
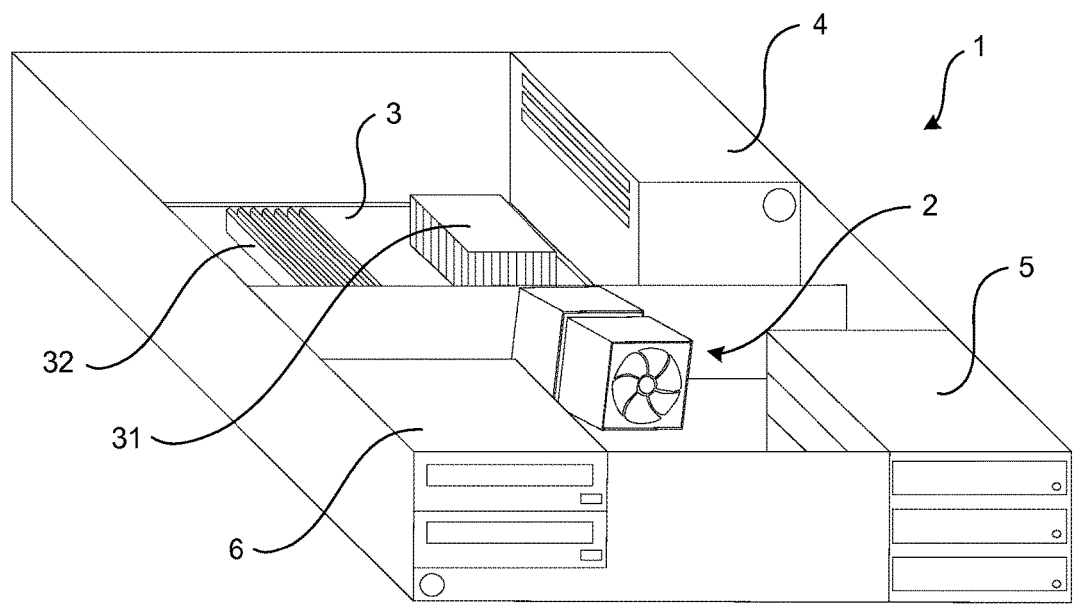
FIG. 1 illustrates an overall configuration of a server computer according to an embodiment of the present invention.

An embodiment of present invention will be described in detail below with reference to the drawings. FIG. 1 illustrates an overall configuration of a server computer of the present invention, where a perspective view of a server 1 is shown. The sever 1 has a counter-rotating axial fan (CR fan) 2, a motherboard 3, a power supply 4, a hard disk drive (HDD) 5, and a compact disc-read only memory (CD-ROM) drive 6. The motherboard 3 further has a central processing unit (CPU) 31 and a random-access memory (RAM) 32. The server 1 may also be referred to as a server apparatus in the present invention. The counter-rotating axial fan 2 may also be referred to as a dual rotating axial fan in the present invention. The motherboard 3 may also be referred to as a circuit board in the present invention.

The server 1 is a computer which works as the main connector between the Internet and users. In some case, the users may be service providers. The server 1 should effectually have high and stable performance because nowadays, every business prefers to work at faster speed. When the server 1 works at high speed, the temperature of electrical equipment inside the server 1 will be high. This will be a serious situation because the server 1 might be broken. If the server 1 is broken, the connection between the Internet and the users will be shut down. The electrical equipment inside the server 1 includes the motherboard 3, the power supply 4, the hard disk drive (HDD) 5, and the compact disc-read only memory (CD-ROM) drive 6, which will be heated in the server 1. Among others, the central processing unit (CPU) 31 on the motherboard can have high temperature, and thus needs to be cooled down the most.

The CR fan 2 includes two axial fans: an upstream fan structure 21 and a downstream fan structure 22. The upstream fan structure 21 and the downstream fan structure 22 may also be referred to as a first axial fan structure and a second axial fan structure in the present invention, respectively. The upstream fan structure 21 and the downstream fan structure 22 may also be referred to as a first fan element and a second fan element, respectively. The upstream fan structure 21 and the downstream fan structure 22 are made of plastic in this embodiment. The CR fan 2 mainly works for decreasing the high temperature in the server 1 by controlling a direction and a speed of the wind. In FIG. 1, the CR fan 2 is located at the center of the server 1, and the CR fan 2 is behind the hard disk drive (HDD) 5, which is on the right hand side, and behind the compact disc-read only memory (CD-ROM) drive 6, which is on the left hand side. Because the position of the CR fan 2 is in front of the motherboard 3 and the power supply 4, the CR fan 2 works efficiently to cool those circuits down.

The motherboard 3 contains the basic circuitry and components of the server 1. The motherboard 3 includes the central processing unit (CPU) 31 and the random-access memory (RAM) 32.

The central processing unit (CPU) 31 is the primary component of the sever 1 or a computer that processes instructions. The central processing unit (CPU) 31 runs the operating system and applications, and constantly receives input from users or active software programs. The central processing unit (CPU) 31 processes data and produces output which may be stored by an application or be displayed on a screen. In this embodiment, the CR fan 2 is located right next to the central processing unit (CPU) 31 on the motherboard so that the central processing unit (CPU) 31 can be cooled down efficiently.

The random-access memory (RAM) 32 is a type of computer memory that can be accessed randomly. That is, any byte of memory can be accessed without touching the preceding bytes. The random-access memory (RAM) 32 is the most common type of memory which is found in computers and other devices.

The power supply 4 is a component that supplies power to the server 1. The power supply 4 converts main AC electric power to regulated DC electric power with low voltage for the internal components of the server 1 which include the CR fan 2, the motherboard 3 having the central processing unit (CPU) 31 and the random-access memory (RAM) 32, the hard disk drive (HDD) 5, and the compact disc-read only memory (CD-ROM) drive 6.

The hard disk drive (HDD) 5 is a data storage device in the server 1 or a computer used for storing and retrieving digital information using rapidly rotating disks coated with magnetic material.

The compact disc-read only memory (CD-ROM) drive 6 is the adaptation of the CD, and is designed to store data in the form of texts and graphics, as well as hi-fi stereo sounds in the server 1. The compact disc-read only memory (CD-ROM) drive 6 can be a digital versatile disc (DVD) drive.

In this embodiment, the CR fan 2 operates to manage the direction and the speed of the air flow toward the above-described components which are necessary to be cooled down efficiently. However, it is not easy to control the direction and the speed of the air flow from the rotating fan.

Figure 2:
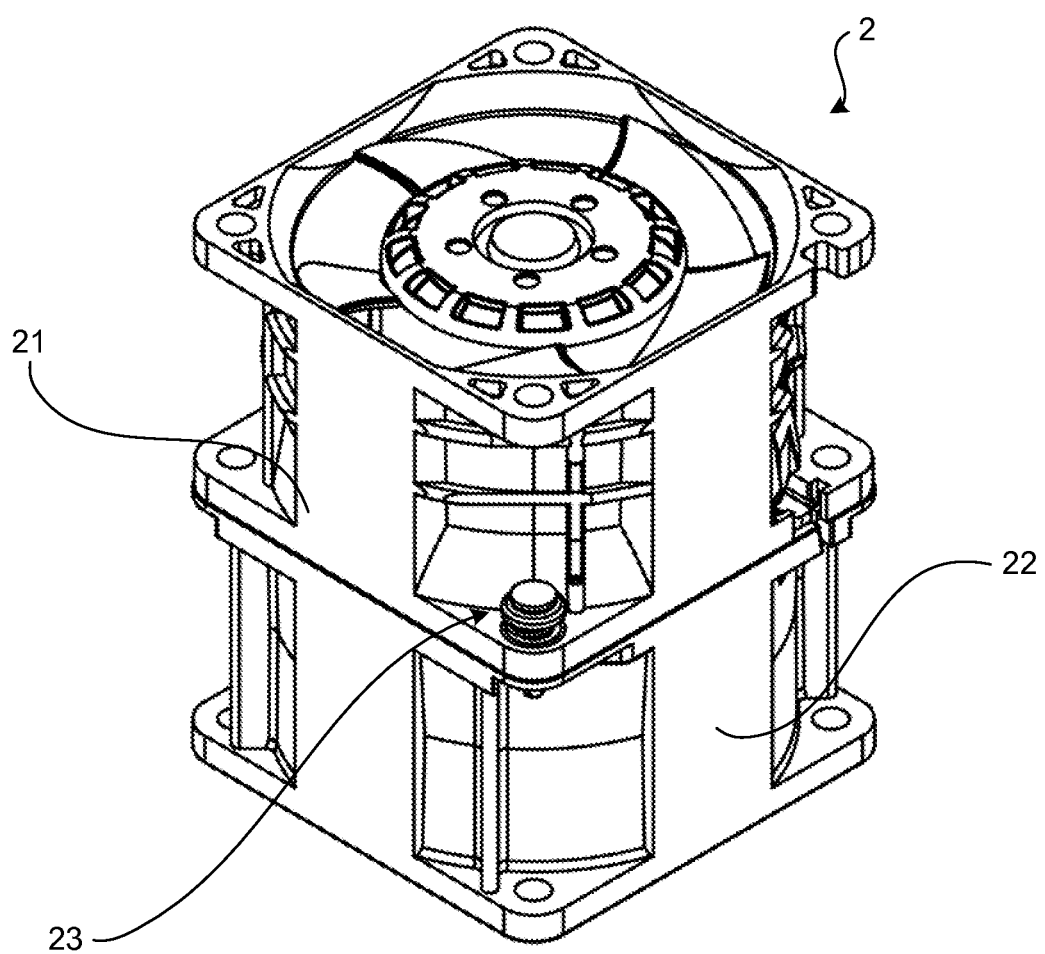
FIG. 2 illustrates an example of a structure of a counter-rotating axial fan (CR fan) pertaining to an embodiment of the present invention.

FIG. 2 illustrates an example of a structure of a CR fan pertaining to the present invention, where a perspective view of the CR fan 2 is shown. As shown in the drawing, the CR fan 2 according to the embodiment includes the upstream fan structure 21, the downstream fan structure 22, and a joint part 23. The joint part 23 may also be referred to as a clamping element in the present invention. The upstream fan structure 21 and the downstream fan structure 22 are movably coupled by the joint part 23 in series so that the upstream fan structure 21 can move relative to the downstream fan structure 22. The upstream fan structure 21 has a rotating motor (a first motor) that rotates an impeller (a first impeller). The first motor and the first impeller are located within a housing of the upstream fan structure 21. The downstream fan structure 22 has a rotating motor (a second motor) that rotates an impeller (a second impeller) in a direction opposite the first impeller. The second motor and the second impeller are located within a housing of the downstream fan structure 22.

The upstream fan structure 21 is the main axial fan for inputting the wind from the outside and discharging the wind into the downstream fan structure 22 to decrease the high temperature in the server 1. The impeller and the rotating motor of the upstream fan structure 21 rotate faster than the impeller and the rotating motor of the downstream fan structure 22. The upstream fan structure 21 and the downstream fan structure 22 are connected face-to-face by the joint part 23.

The downstream fan structure 22 is the secondary axial fan that discharges the wind into the correct direction from the upstream fan structure 21 to decrease the high temperature in the server 1. The impeller and the rotating motor of the downstream fan structure 22 rotate slower than the impeller and the rotating motor of the upstream fan structure 21. However, the impeller and the rotating motor of the downstream fan structure 22 may rotate at the same speed as the impeller and the rotating motor of the upstream fan structure 21 in some configuration, which depends on the requirement from the user. The downstream fan structure 22 and the upstream fan structure 21 are connected by the joint part 23. The joint part 23 connects the upstream fan structure 21 and the downstream fan structure 22 together.

Figure 3:
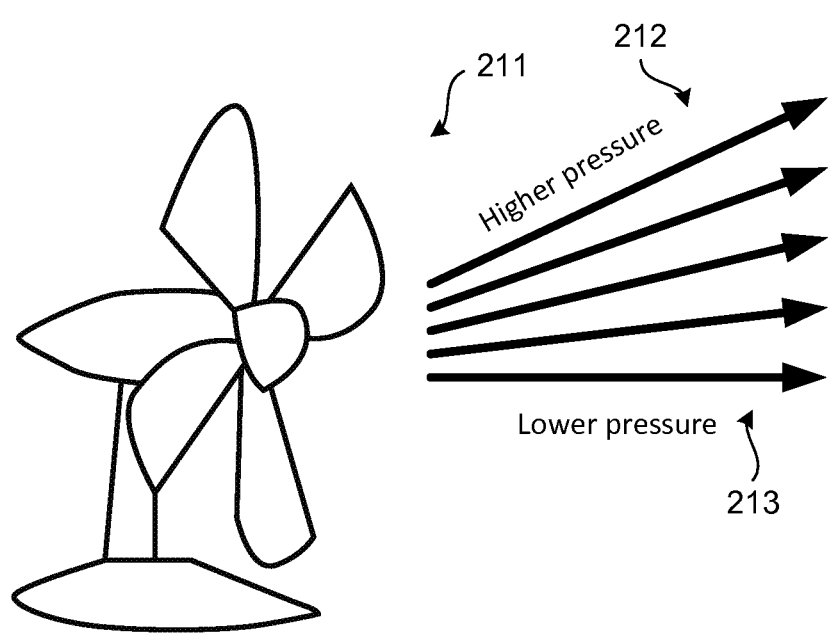
FIG. 3 illustrates an example of an air flow of an axial fan with increasing pressure.

FIG. 3 illustrates an example of an air flow of an axial fan with increasing pressure. FIG. 3 also shows an example of an axial fan 211 which has several pressure directions. The pressure direction includes a direction of a higher pressure 212 and a direction of a lower pressure 213. One result of the axial fan 211 is that if the fan is operating in a high pressure region, the exit direction of the air flow moves away from the axial direction and approaches a diagonal direction in FIG. 3. That is, there is a greater flow of air exiting the fan in a generally diagonal direction, than the flow of air exiting the fan along the fan's axis. As a result, there will be a problem if items to be cooled should be placed on the same axis as the fan. It is important to keep this in mind when cooling solutions are designed to ensure that proper areas receive the maximum air flow.

Figure 4:
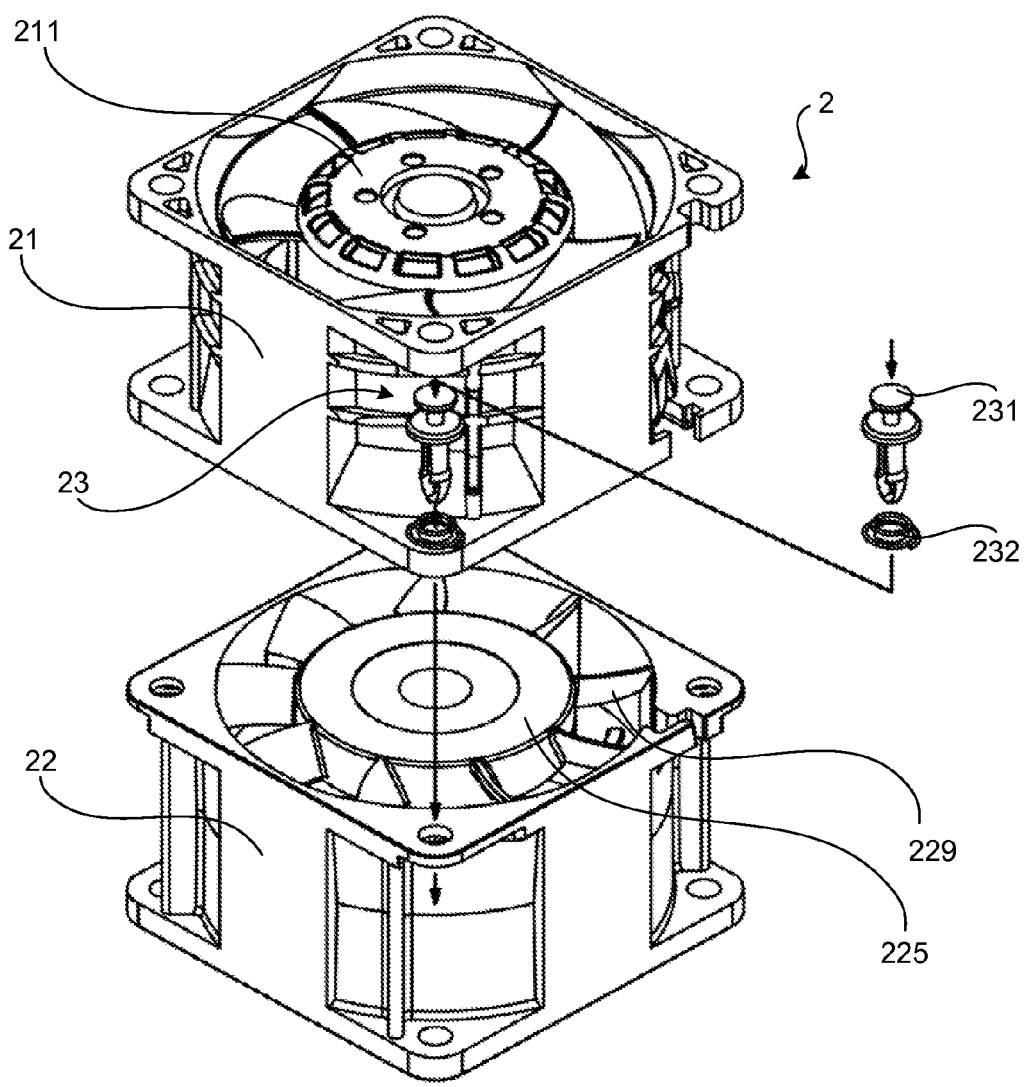
FIG. 4 illustrates an exploded example of the CR fan in FIG. 2.
Figure 5:
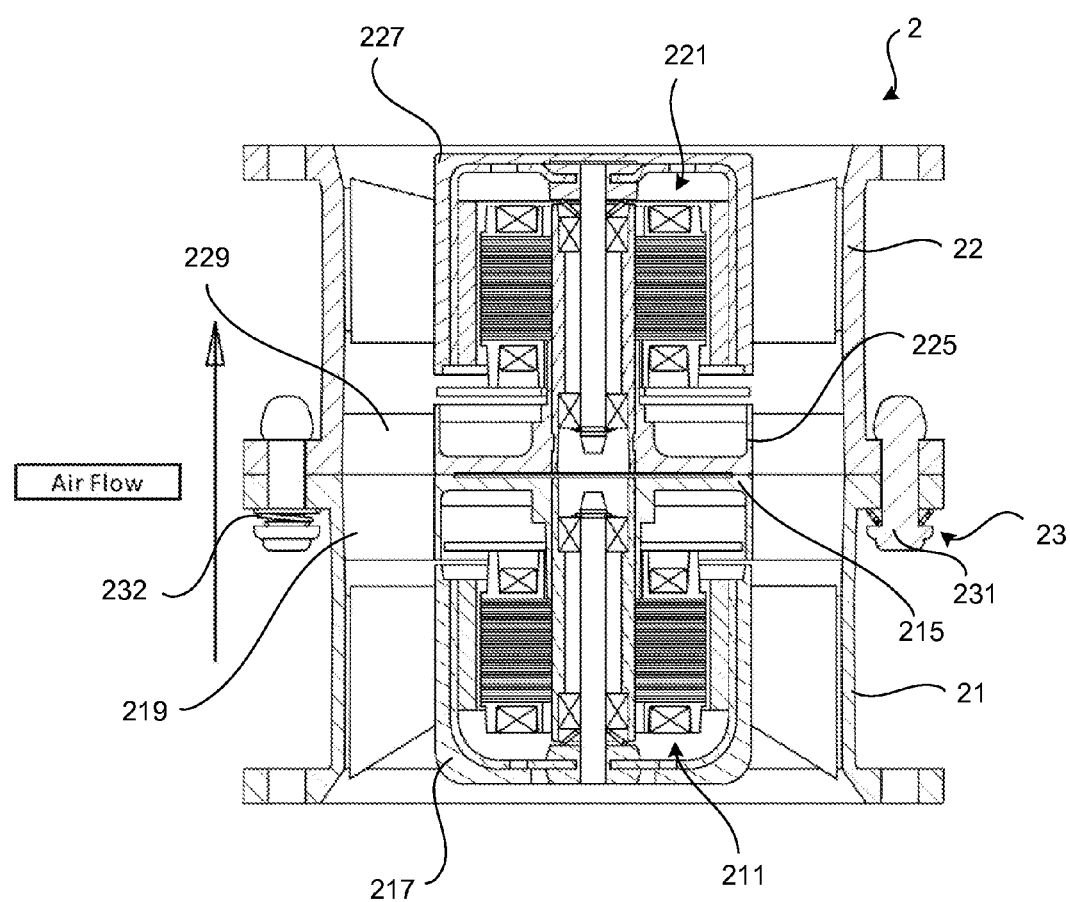
FIG. 5 illustrates a cross-sectional view of the CR fan in FIG. 2.

FIG. 4 shows an exploded perspective view of the CR fan 2, and FIG. 5 shows a cross-sectional view of the CR fan 2. As shown in FIG. 5, the CR fan 2 according to the embodiment includes the upstream fan structure 21, an upstream fan rotating motor 211, an upstream fan motor base 215, an upstream fan impeller 217, an upstream fan stationary blade 219, the downstream fan structure 22, a downstream fan rotating motor 221, a downstream fan motor base 225, a downstream fan impeller 227, a downstream fan stationary blade 229, and the joint part 23 which includes a rivet 231 and a spring 232. The rivet 231 may also be referred to as a fastener in the present invention.

The upstream fan structure 21 includes the upstream fan impeller 217 and the upstream fan rotating motor 211. The upstream fan rotating motor 211 is the motor of the upstream fan structure 21 that rotates the upstream fan impeller 217 at the high rotating speed. The rotating speed of the upstream fan rotating motor 211 is faster than the downstream fan rotating motor 221, and the upstream and the downstream fan impellers rotate in the counter directions from each other. The rotating motor 221 rotates the impeller of the downstream fan structure 22 in a direction opposite the impeller of the upstream fan structure 21. The upstream fan structure 21 and the downstream fan structure 22 are connected by the joint part 23. Also, the upstream fan stationary blade 219 is fixed to the upstream fan motor base 215.

The downstream fan structure 22 includes the downstream fan impeller 227 and the downstream fan rotating motor 221. The downstream fan rotating motor 221 is the motor of the downstream fan structure 22 that rotates the downstream fan impeller 227 at the high rotating speed. The rotating speed of the downstream fan rotating motor 221 is slower than the upstream fan rotating motor 211, and the upstream and the downstream impellers rotate in the counter directions from each other. The downstream fan structure 22 and the upstream fan structure 21 are connected by the joint part 23. Also, the downstream fan stationary blade 229 is fixed to the downstream fan motor base 225.

The joint part 23 connects the upstream fan structure 21 and the downstream fan structure 22. The upstream fan structure 21 and the downstream fan structure 22 include the rivet 231 and the spring 232.

The rivet 231 is a connector that passes through a connecting hole of the upstream fan structure 21 and a connecting hole of the downstream fan structure 22 to be maintained firmly. A housing edge of the downstream fan structure 22 has a dent around the connecting hole.

The spring 232 is a helical coil spring that can be supported by the rivet 231. The spring 232 is installed adjacent to the connecting hole. The spring 232 is inserted between an end of the rivet and a part of the upstream fan structure 21 in this embodiment. If the joint part is attached from the side of the downstream fan structure 22, the spring 232 is inserted between the end of the rivet and a part of the downstream fan structure 22. Therefore, the spring 232 may be inserted between the rivet and any one of the upstream fan structure 21 and the downstream fan structure 22. The spring 232 can decrease vibration generated by the upstream fan rotating motor 211 and the downstream fan rotating motor 221.

In this embodiment, the spring 232 works to reduce vibration occurred by the rotating structures. It is assumed that the spring 232 can absorb the vibration, and also change the natural frequency of the CR fan 2 itself, which may be the main reason for the reduction of vibration. The effect of reducing vibration is particularly notable when the CR fan 2 rotates at high speed. This will be explained in detail later.

Figure 6:
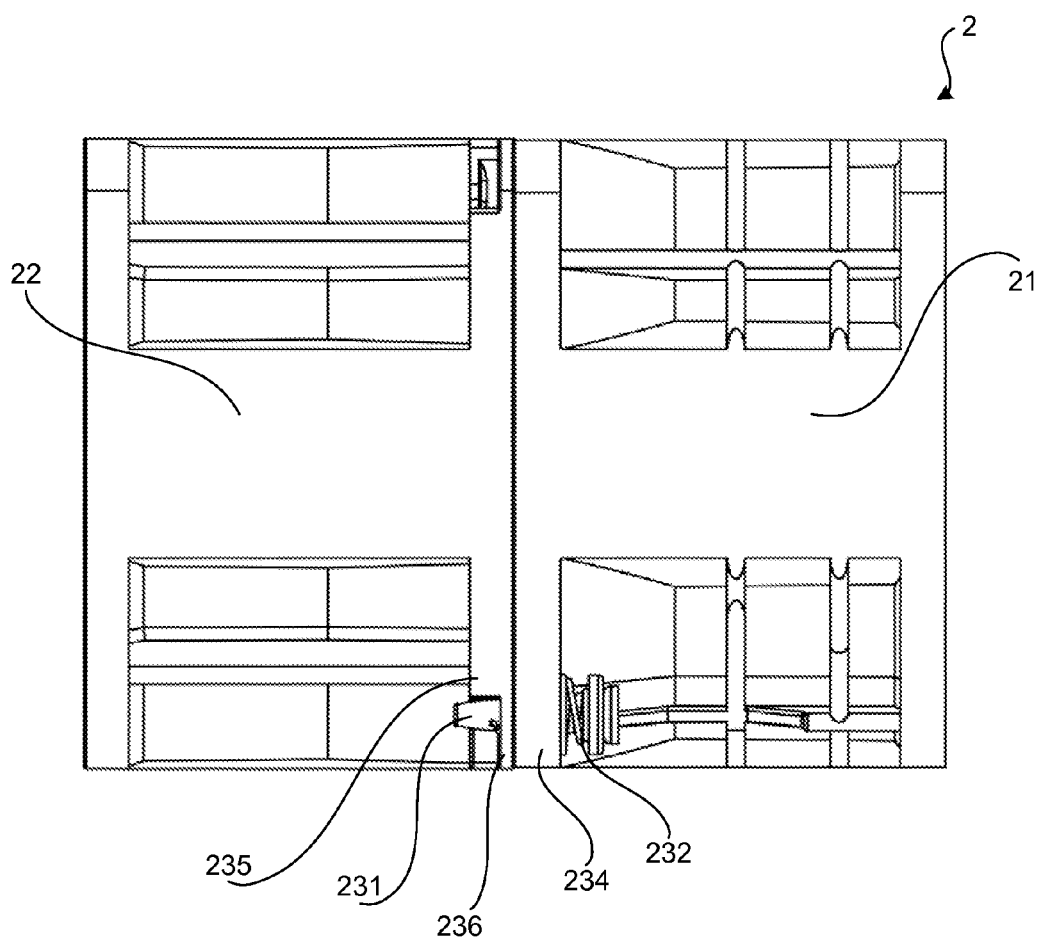
FIG. 6 illustrates a side-view of the CR fan in FIG. 2.

FIG. 6 illustrates is a side-view of the CR fan in FIG. 2. As shown in the drawing, the CR fan 2 according to the embodiment includes the upstream fan structure 21, the spring 232, the downstream fan structure 22, and the rivet 231.

The upstream fan structure 21 includes the rivet 231 and the spring 232. The rivet 231 and the spring 232 are installed at the right side of the connecting hole 233 of an edge area 234 of the upstream fan structure 21 in FIG. 6. The spring 232 can decrease vibrations generated by the upstream fan structure 21 and the downstream fan structure 22.

The downstream fan structure 22 includes the rivet 231. The rivet 231 is a connector that passes through the connecting hole 233 between the edge area 234 of the upstream fan structure 21 and an edge area 235 of the downstream fan structure 22 to fix firmly both of housing edges. The edge area 235 of the downstream fan structure 22 has a dent 236 around the connecting hole 233. The depth of the dent 236 is thinner than the edge area 235 of the downstream fan structure 22. This structure is useful because it allows using the rivet 231 which is short. However, the dent 236 can be omitted if a longer rivet is used. Also, it is possible to decrease the thickness of the edge area 235 instead of creating the dent 236 and use the rivet 231.

Figure 7:
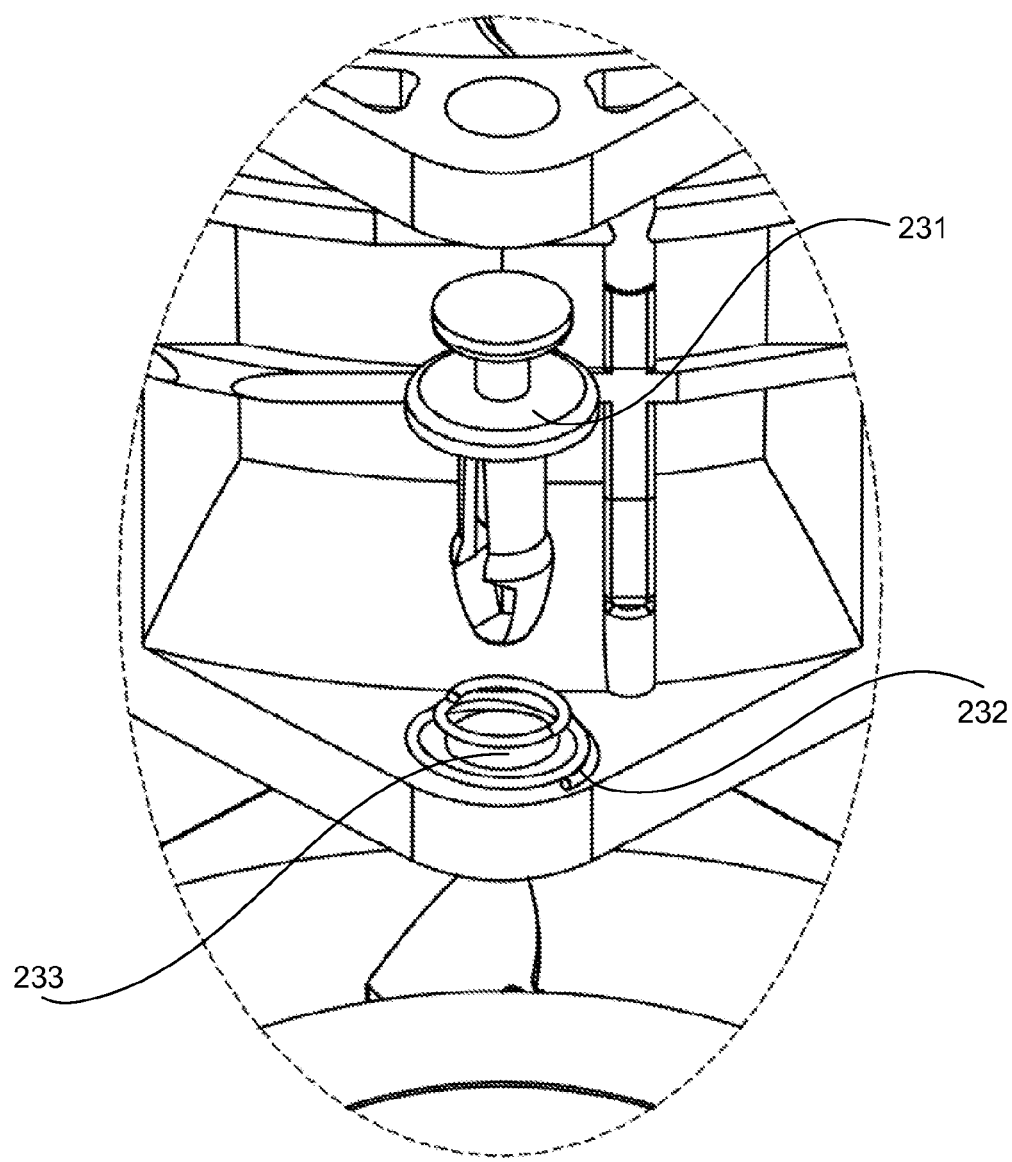
FIG. 7 illustrates an enlarged view of the rivet and the spring illustrated in FIG. 4.

FIG. 7 shows an enlarged view of the rivet 231 and the spring 232. As shown in the drawing, the CR fan 2 according to the embodiment includes the rivet 231 and the spring 232.

The rivet 231 is a connector that passes through the connecting hole 233 between the connecting holes of the upstream fan structure 21 and the downstream fan structure 22 to keep moderately and firmly the housing edges attached.

The spring 232 is a coil spring that can be a supporter for the rivet 231. In FIG. 7, the spring 232 is positioned right on the connecting hole 233. The spring 232 can decrease vibrations generated by the upstream fan structure 21 and the downstream fan structure 22.

In this embodiment, the spring 232 can work to reduce vibrations occurred by the rotating structures. The spring 232 can absorb the vibration.

Figure 8:
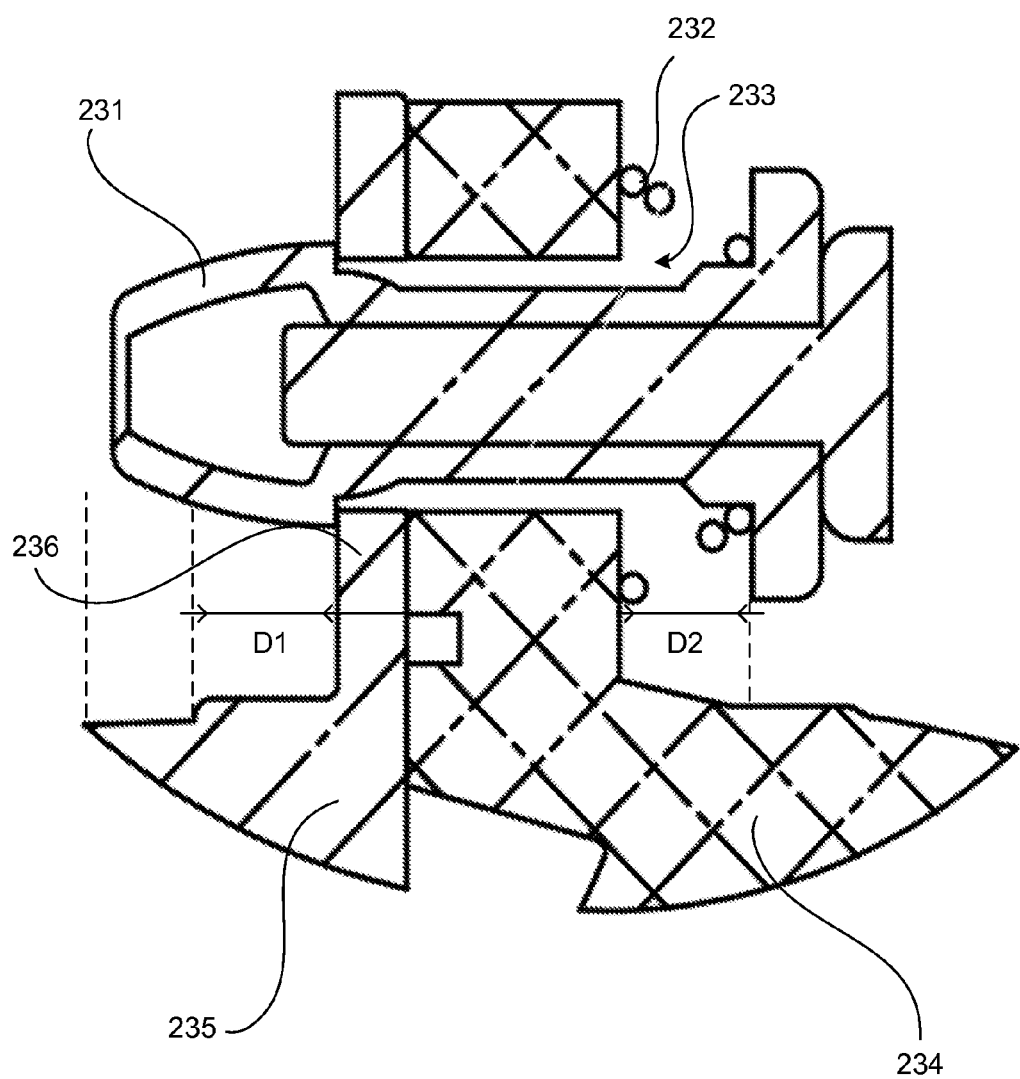
FIG. 8 illustrates a cross-sectional view of the rivet for the CR fan in FIG. 2.

FIG. 8 illustrates a cross-sectional view of the rivet of the CR fan 2. As shown in the drawing, the CR fan 2 according to the embodiment includes the rivet 231. The rivet 231 is a connector that passes through the connecting hole 233 between the upstream fan structure 21 and the downstream fan structure 22 to fix firmly both of the housing edges. D1 is a depth of the dent 236 which is located at the edge area 235. D2 is a height of the spring 232 which is located at the edge area 234. In this embodiment, D1 and D2 have substantially the same height. If there were no D1 and that portion is filled with a material and also there were no D2 and no spring 232 at that portion, the rivet 231 would be located at further left in FIG. 8. In this case, both of the housing edges would be attached too firmly to each other. This is the structure of a conventional CR fan, which could generate strong vibration when the rotation speed is high.

However, in this embodiment, the dent 236 has the depth D1, and D1 causes the rivet 231 to locate at further right in FIG. 8. Also, the spring 232 allows the rivet 231 to slightly move during vibration. The rivet 231 obtains a slight play compared to the conventional structure. The rivet 231 is biased to the right direction by the spring 232 in FIG. 8. The rivet 231 is movable in the range of D2 because there is a little play, even if the rivet 231 is pressed from the right direction. That is, the rivet 231, which is a part of the joint part 23, can move relative to the upstream fan structure 21. In other words, the two housing structures are movable in the range of D2. This can also be said that one of the upstream fan structure 21 and the downstream fan structure 22 can move relative to the other fan structure. Although this movement is a slight movement, this is assumed to result in reduction of vibration.

It is assumed that this slight play of the rivet 231 or the housing structures can change the natural frequency of the CR fan 2 as a whole. Even if the two housing structures are taped up together to prevent an air flow leaking between the two fans, the slight play will still exist. In addition, by having the dent 236, the edge area 235 may protect the rivet 231 from any accidents of collisions.

The resonance may not occur if the housing structures are made of aluminum because aluminum housing has a better dumping effect compared to resin housing. However, it will raise the cost higher than using plastic structures. Therefore, in this embodiment, the plastic material is used for the housing structures. In this regard, the present invention provides a solution which does not increase the cost of the product while overcoming the technical problem.

Figure 9A:
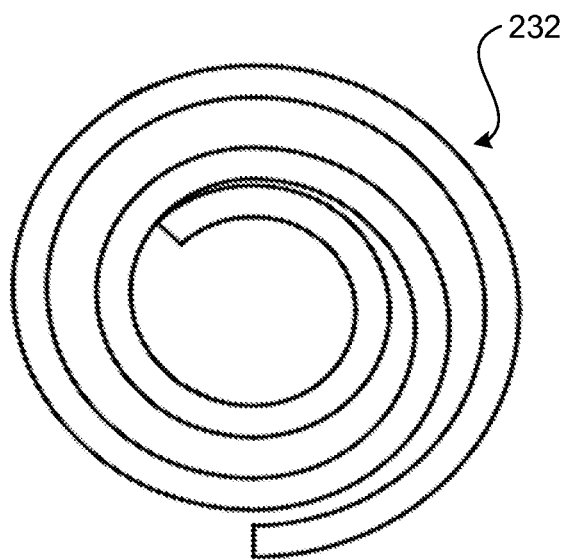
FIG. 9A is a top plan view of the spring.
Figure 9B:
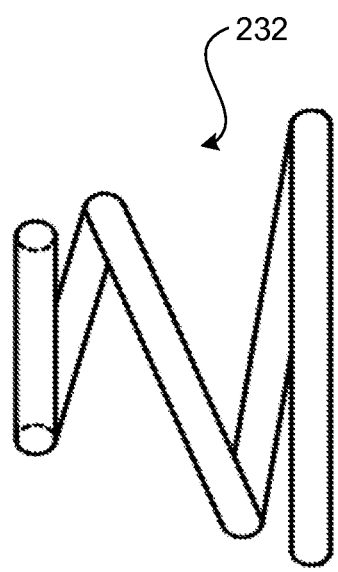
FIG. 9B is a side view of the spring.

FIG. 9A is a top plan view of the spring 232, while FIG. 9B is a side view of the spring 232. In this embodiment, the spring 232 has a basic specification of 0.25 mm gap, 4 mm spring height, diameters of $\phi 4.0$ and 7.7, and closed end. The spring 232 is set in D2. In this embodiment, D2 is slightly less than 2 mm. The spring 232 is sized to generate a clamp load that allows the relative movement between the upstream fan structure 21 and the downstream fan structure 22. In this embodiment, the spring load is around 500 g at this height. It is assumed that the load for the spring 232 in the range of 250 g to 750 g is preferable for reducing vibration of the CR fan 2.

Figure 10:
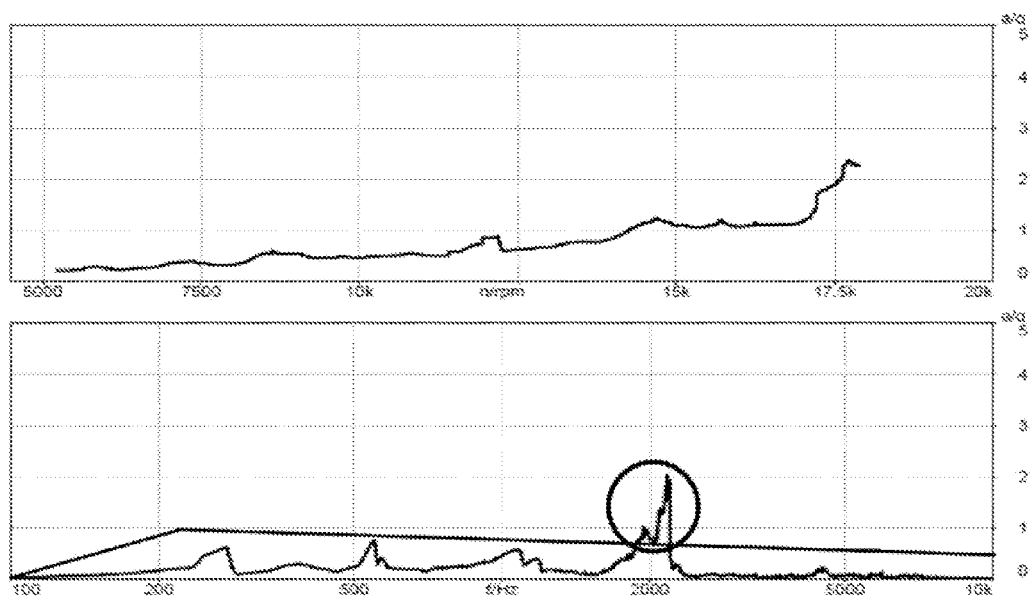
FIG. 10 shows experimental results for a conventional CR fan.

FIG. 10 shows experimental results for a conventional CR fan. In this experiment, a conventional CR fan made of plastic is used where two fan structures, each of which having the size of 60 mm×60 mm×38 mm, are combined. Unlike the CR fan 2 in the present invention, a spring is not used to combine the two fan structures. The upper graph shows the relationship between the rotation speed and the vibration acceleration of the conventional CR fan. The lower graph is a spectrum obtained by FFT analysis of the signal represented in the upper graph. Thus, the lower graph shows the relationship between the frequency and the corresponding frequency component of the vibration acceleration of the conventional CR fan.

The upper graph of FIG. 10 without using the spring 232 shows the results of measuring the relationship between the rotation speed (rpm) of the upstream fan structure and the vibration acceleration at a specific position in the conventional CR fan. The vertical axis represents the value (a/g) which is the vibration acceleration divided by the gravitational acceleration (G=9.8 m/s$^2$), i.e., the vertical axis corresponds to the vibration acceleration expressed in terms of G. The rotation speed was changed linearly by applying a PWM signal to a variable speed input terminal at both of the upstream and downstream fans. The rotation speed of the upstream fan structure was changed between 5,000 rpm up to 18,000 rpm within 100 seconds. The rotation speed of the downstream fan structure was also changed along with the change of the rotation speed of the upstream fan structure. However, as the maximum rotation speed of the downstream fan structure was about 17,000 rpm, the variable range of the downstream fan structure was from about 5,000 rpm to 17,000 rpm. The input voltage to the conventional CR fan was constantly 12V.

To be more specific, the upstream fan structure was set at 18,000 rpm (max speed), and the downstream fan structure was set at 17,000 rpm (max speed), at the beginning. Then, the rotation speeds of both of the fans were reduced by using the percentage. For example, both of the fans were reduced as 95%, 90%, 85%, and the like. Finally, the percentage was around 30%. The first graph shows a bump (large vibration) which is over 2G at about 18,000 rpm. In the conventional CR fan, because such a high rotation speed was not required, the problem of such a large vibration did not occur. However, as the performance of a server increases, higher performance (i.e. higher rotation speed) of the CR fan is also desired these days. In the case of a CR fan with two axial fans having the size of 60 mm×60 mm×38 mm respectively, the rotation speed of more than 15,000 rpm is the high speed range desired these days. This experiment was conducted to meet such a desire.

The lower graph of FIG. 10 shows the relationship between the frequency and the frequency component of the vibration acceleration of the conventional CR fan at the rotation speed of 18,000 rpm. More precisely, the lower graph is a spectrum obtained by FFT analysis of the vibration signal corresponding to 18,000 rpm in the upper graph.

Generally, higher rotation speed causes vibrations of higher frequency. The fundamental frequency for 18,000 rpm is f=18,000 rpm/60 s=300 Hz. The vibration signal contains frequency components corresponding to the fundamental frequency f and its harmonic components which are the components whose frequencies are multiples of frequency f. Accordingly, the lower graph of FIG. 10 shows peaks at about 300 Hz, 600 Hz, 1,200 Hz, 2,100 Hz, i.e., at frequencies of f, 2f, 4f and 7f. In this embodiment, the frequency component higher than about 2,300 Hz has very small contribution to the vibration. The lower graph shows a bump which is higher than 2G at 2,200 Hz. It is assumed that this bump (large vibration) was caused by the resonance with the natural frequency of the conventional CR fan. Therefore, it is also assumed that the natural frequency of the conventional CR fan used in this experiment was around 2,200 Hz and the resonance occurred because this value is close to the harmonic frequency corresponding to 2,100 Hz.

Figure 11:
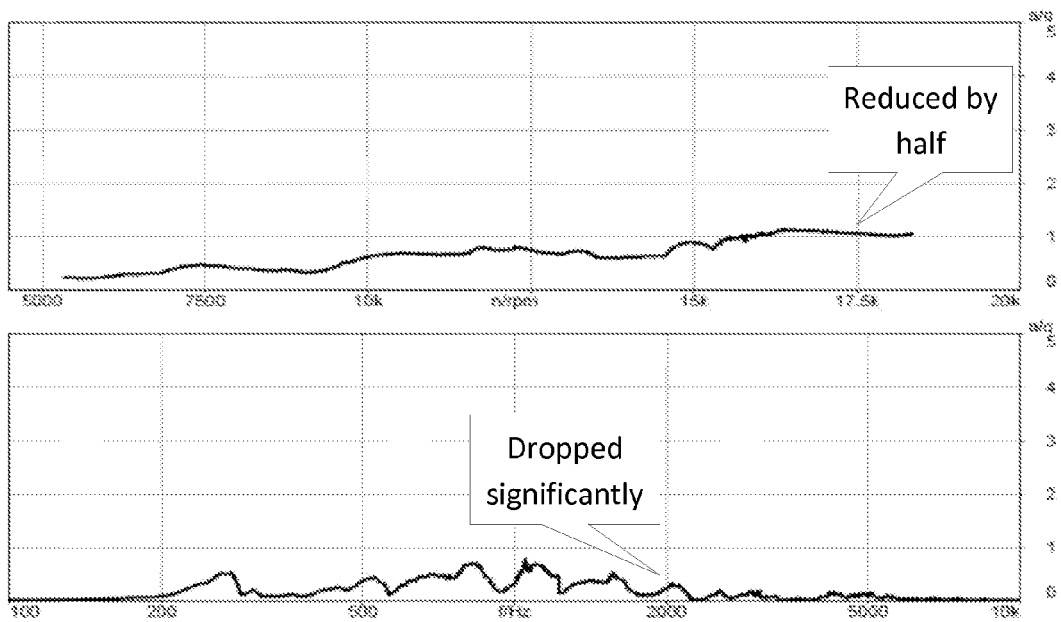
FIG. 11 shows experimental results for the CR fan according to an embodiment of the present invention.

FIG. 11 shows experimental results for the CR fan 2 according to the present invention. In this experiment, the CR fan 2 made of plastic is used where two fan structures, each of which having the size of 60 mm×60 mm×38 mm, are combined. As explained above, the spring 232 is used to combine the two fan structures. The use of the spring 232 was the difference between the experimental results in FIG. 10 and the experimental results in FIG. 11. The experiment was conducted in the same way as the one conducted in FIG. 10. The upper graph shows the relationship between the rotation speeds of the upstream fan structure 21 and the vibration acceleration at the specific position of the CR fan 2. The lower graph is a spectrum obtained by FFT analysis of the vibration signal corresponding to the rotation speed of 18,000 rpm in the upper graph, which shows the relationship between the frequency and the frequency component of the vibration acceleration of the CR fan 2.

The upper graph of FIG. 11 shows the results of measuring the relationship between the rotation speed and the vibration acceleration. As can be seen, the vibration acceleration at the high rotation speed, such as more than 15,000 rpm, is generally reduced. Among all, the sudden increase of the vibration acceleration seen in the upper graph in FIG. 10 at around 17,500 rpm is roughly reduced by half, which is a remarkable reduction.

The lower graph of FIG. 11 shows the relationship between the frequency and the frequency component of the vibration acceleration of the conventional CR fan. The lower graph shows a spectrum obtained by FFT analysis where the vibration acceleration is lower than 1G at around 2,100 Hz. The bump which was seen in the lower graph of FIG. 10 at 2,200 Hz disappeared, which means the large vibration at that frequency was significantly reduced. This shows how improved it was when the rivet 231 and the spring 232 were used compared to when only the rivet 231 was used without the spring 232. The reason is assumed that the natural frequency of the CR fan 2 itself was changed to a higher level If the natural frequency is shifted to a level higher than 2,300 Hz, the vibration caused by the rotation does not resonate with the natural frequency of the CR fan 2 itself because the frequency component at a frequency higher than 2,300 Hz is very small.

The present invention is explained concretely using the plurality of the drawings and flowcharts. Needless to say, the present invention is not limited to those and the ways the present invention is carried out, and any products fall within the technical scope of the present invention as long as the products include the essential part of the present invention.

For example, the shape or design of the rivet can be changed into the other shapes or designs such as a bolt, a screw, a nut and a locknut or other shapes, including the dimension or the size. Also, the present invention is not limited to the material of the rivet, so a bolt, a screw or a nut and a locknut can be plastic, metal, wood or other materials. As well as the spring, it can be changed into the other dimension or the size. Also, the present invention does not limit the material of the spring, so the spring can be plastic, metal or other materials. The present invention is not limited to the use within a computer, and it can be used in any electrical equipment or other devices. The position of this present invention is not limited to at the center of the computer, so it can be adjusted in many ways such as left or right side; top or bottom side.

What is claimed is:

1. A dual rotating axial fan comprising:
   a first axial fan element having a first motor that rotates a first impeller;
   a second axial fan element having a second motor that rotates a second impeller; and
   a clamping element coupling the first axial fan element to the second axial fan element in series so that the first axial fan element or the clamping element can move relative to the second axial fan element.

2. The dual rotating axial fan of claim 1, the clamping element further comprising:
   a fastener positioned through a portion of both the first and second fan elements; and
   a helical spring positioned about a long axis of the fastener.

3. The dual rotating axial fan of claim 2, wherein the helical spring is sized to generate a clamp load that allows the relative movement between the first and second fan elements.

4. The dual rotating axial fan of claim 2, wherein the helical spring has a load in the range of 250 g to 750 g.

5. The dual rotating axial fan of claim 1, wherein the second motor rotates the second impeller in a direction opposite the first impeller.

6. A computer comprising:
   a circuit board;
   a power supply;
   a hard disk drive; and
   a dual rotating axial fan which cools down the circuit board, the dual rotating axial fan having a first axial fan structure and a second axial fan structure which are connected face-to-face in series by a joint part,
   wherein the joint part has a rivet and a spring.

7. The computer of claim 6, wherein the spring is inserted between an end of the rivet and any one of the first axial fan structure and the second axial fan structure.

8. The computer of claim 6, wherein the spring has a load in the range of 250 g to 750 g.

9. The computer of claim 6, wherein a first impeller of the first axial fan structure and a second impeller of the second axial fan structure rotate in the counter directions from each other.

10. The computer of claim 6, wherein the second fan structure further has a suction port at the first fan structure side and a discharge port at the other side, and an air flow from the discharge port is discharged approximately in a straight line to an air channel between the suction port and the discharge port.

11. A counter-rotating axial fan comprising:
   a first axial fan element having a first motor that rotates a first impeller, the first motor and the first impeller being located within a first fan housing;
   a second axial fan element having a second motor that rotates a second impeller in a direction opposite the first impeller, the second motor and the second impeller being located within a second fan housing; and
   a clamping element coupling the first fan housing to the second fan housing in series,
   wherein the clamping element includes a fastener having a spring located about the fastener.

12. The counter-rotating axial fan of claim 11, wherein the fastener and the spring movably couple the first fan housing to the second fan housing so that the first fan housing or the fastener can move relative to the second fan housing.

13. The counter-rotating axial fan of claim 11, wherein the clamping element couples the first fan housing to the second fan housing at edges of the first fan housing and the second fan housing.

14. The counter-rotating axial fan of claim 11, wherein an airflow generated by the first impeller is directed toward the second impeller.

15. The counter-rotating axial fan of claim 11, wherein the spring has a load in the range of 250 g to 750 g.

16. The counter-rotating axial fan of claim 11, wherein the first and the second fan housings are made of plastic.

17. The counter-rotating axial fan of claim 11, wherein the edge of the first fan housing or the second fan housing has a dent around the fastener and the connecting hole, and the dent around the connecting hole has a depth approximately same to a height of the spring in an assembled state.

18. A dual rotating axial fan comprising:
a first axial fan element having a first motor that rotates a first impeller;
a second axial fan element having a second motor that rotates a second impeller; and
a clamping element coupling the first axial fan element to the second axial fan element in series so that the first axial fan element or the clamping element can move relative to the second axial fan element;
with the clamping element further comprising a fastener positioned through a portion of both the first and second fan elements and a helical spring positioned about a long axis of the fastener.

19. The dual rotating axial fan of claim 18, wherein the second motor rotates the second impeller in a direction opposite the first impeller.

\* \* \* \* \*